Aug. 16, 1938.  F. L. MOSELEY  2,126,910
ELECTRICAL CONTROL SYSTEM
Filed June 20, 1935   2 Sheets-Sheet 2

INVENTOR
FRANCIS L. MOSELEY
BY
Herbert H. Thompson
HIS ATTORNEY.

Patented Aug. 16, 1938

2,126,910

UNITED STATES PATENT OFFICE 2,126,910

ELECTRICAL CONTROL SYSTEM

Francis L. Moseley, Pelham, N. Y., assignor to Sperry Gyroscope Company, Inc., Brooklyn, N. Y., a corporation of New York

REISSUED

DEC 21 1948

Application June 20, 1935, Serial No. 27,471

16 Claims. (Cl. 172—282)

This invention relates generally to electrical control systems, and is applicable to electrical systems for the positional control of a driven object from a sensitive element. It is especially adapted for the control of the rudder of a ship from a sensitive indicator, such as a magnetic compass, since it has no frictional contacts and places no loads whatever on the sensitive needle. I have therefore shown my invention as applied to the automatic steering of a dirigible water or air craft.

My invention is also adapted to be employed as a follow-up system for a sensitive element, such as a gyroscopic compass. It may also be used to transmit to remote points the indications of meter or other indicators, and to control from such indications apparatus requiring power for its operation, by means of the circuits to be described. Thus, voltage regulators and similar devices may be controlled by direct pick-off from meter indications.

As the pick-off means from the sensitive element, I propose to employ a condenser or condensers. While I am aware that, broadly, such an idea is not new, the prior systems have not met with success owing to lack of sensitivity and inability to utilize the minute changes in capacity which may be realized in practice. In my invention, I have avoided the difficulties of the prior art and have devised a circuit which is extremely sensitive to minute changes of position of the condenser plate, and which by a suitable choice of operating frequency may be made to utilize condenser plates as small as desired.

The principal object of the present invention is to provide a novel control system employing condenser means operated by a controlling element, said condenser means being included in a tunable circuit that is inductively related to a source of high frequency oscillations, and rectifier means supplied from said tunable circuit for controlling the operation of motive or indicating means, the movement of said controlling element serving to vary the capacity of said condenser means, thereby effecting changes in the potential supplied from said tunable circuit to said rectifier means for correspondingly varying the operation of said motive or indicating means.

Another object of the present invention lies in the provision of a novel control system of the above character wherein said condenser means is substantially frictionless in operation, adapting the same to be actuated in its movements by delicate indicating or metering mechanism as well as by more powerful hand or power operated controllers.

Still another object of the present invention is to provide a novel control system that is applicable to the remote control of ponderable objects from sensitive indicating or metering means wherein a variable signal potential produced by the controlling means is caused to operate the controlled object, having means associated therewith for producing an opposing variable potential that is adapted to completely nullify said signal potential when said controlled object has reached synchronism with said controlling object, said system being also applicable to follow-up systems wherein movement of the controlling element relative to the follow-up element produces a variable potential that serves to control the operation of motive means connected to the controlled object, said motive means acting to cause the follow-up element to realign itself with said controlling element, while simultaneously driving auxiliary units, if desired.

Other objects and advantages will become apparent as the description proceeds.

In carrying out my invention, I employ a variable condenser as one element of a tunable circuit that is suitably coupled to a high frequency oscillatory circuit, thereby obtaining exceeding sharpness of potential change in said tuned circuit with variations of the condenser setting. The variable potential thus produced is supplied to a suitable rectifier, such as a thermionic tube having an A. C. or D. C. plate supply, whereby changes of the condenser setting effect proportional changes of the plate current of said tube, thus making available a low frequency or D. C. voltage adapted for transmission to remotely situated controlled motive or indicating means.

Figure 1:
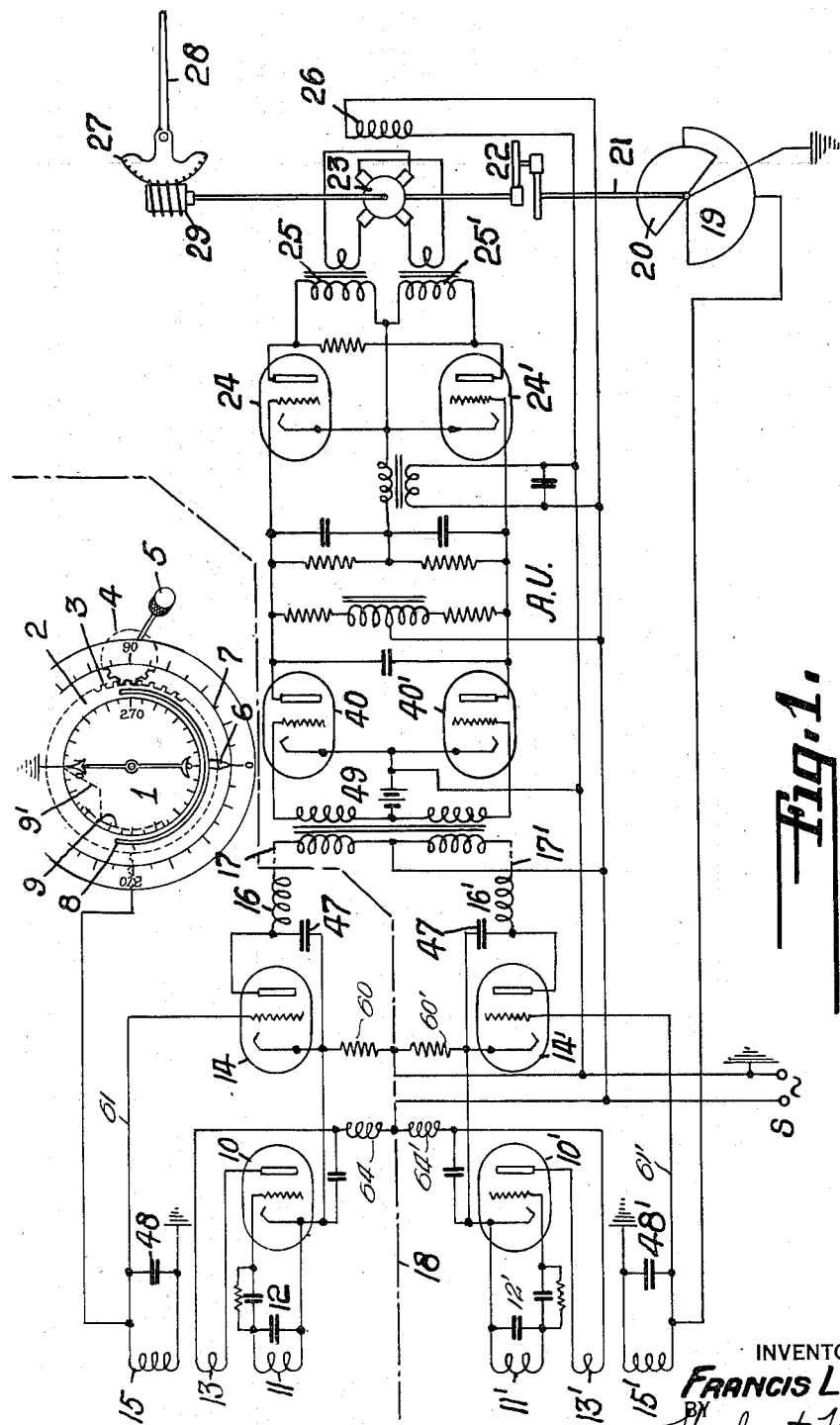
Fig. 1 is a diagram illustrating my invention as applied to the automatic steering of a craft.

Referring now to Fig. 1, a magnetic compass rose is indicated at 1, the same being pivoted within a bowl 2. One plate 8 of the condenser 8—9 is secured to a ring gear 3 and the other plate 9 is mounted on the compass rose or magnetic needle element and is shown grounded as by a lead 9'. The plate 8 is shown as extending around a substantial arc, i. e., about 180°, while the condenser plate 9 is of less length. The two condenser plates are normally positioned as indicated in the drawings. The condenser plate 8 is mounted for adjustment about a vertical axis in order to change course. For this purpose this condenser plate 8 is shown as being carried on the ring gear 3 with which a pinion 4 engages, the pinion being turned from knob 5. If desired, the gear 3 may be provided with a pointer 6 readable upon a fixed scale 7 to show the course changes.

Figure 2:
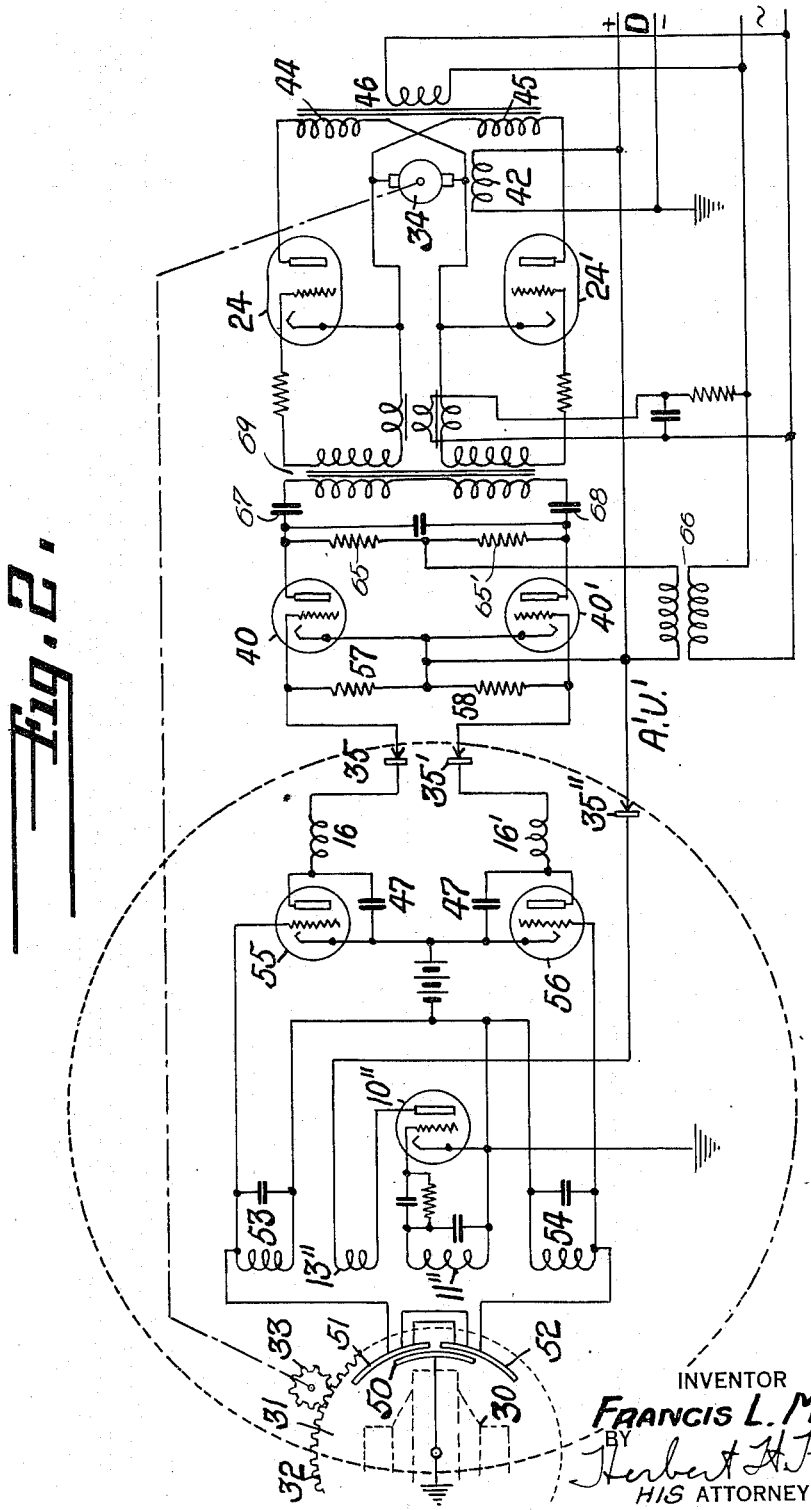
Fig. 2 is a somewhat similar diagram showing my invention applied to a follow-up system for sensitive instruments, such as a gyroscopic compass.

As a source of high frequency, I have shown an oscillation generator consisting of an electron vacuum tube 10, inductance coil 11, condenser 12 and feed back coil 13, inductively coupled with coil 11 and in the plate circuit of the tube 10, which is shown as supplied with commercial frequency A. C. from supply S, but which may alternatively be supplied with D. C., as shown in Fig. 2. The circuit for heating the filaments of the several tubes is omitted throughout the drawings for the sake of clearness. The radio frequency generated by the oscillator is supplied to the condenser and to the grid of a rectifier tube 14 by means of a coupling coil 15 which forms a tunable circuit with the fixed padding condenser 48 and the variable condenser 8—9. One side of the coil 15 and condenser 48 is shown grounded. The radio frequency signal produced by oscillator winding 13 and reaching the grid of tube 14 may be sharply varied by the adjustment of the condenser 8—9 to tune this circuit. The plate of tube 14 is supplied with commercial frequency alternating current from said supply S and the output of the tube will hence vary in accordance with said radio frequency signal. The radio frequency portion of the tube output is eliminated by a choke coil 16 and condenser 47, so that the current through the wire 17 beyond the choke is of relatively low frequency and is adapted to be transmitted in unaltered form through lead 17 to remotely situated amplifying and power control means.

The parts so far described are shown as enclosed within a dotted line 18 to represent that they are preferably placed adjacent the compass in the pilot house. In the form of the invention illustrated in Fig. 1, the wire 17, containing ordinary alternating current of low frequency, may be led the length of the ship to the after end, either before or after passing through the amplifier unit A. U. shown as comprising the four tubes 40, 40', 24 and 24' and associated apparatus shown in the middle of the figure.

The system so far described would not, of course, steer a ship satisfactorily since it has no follow-back from the rudder to position the rudder proportionally to the ship's deviation from its set course. A very simple method of providing the follow-back according to my invention, is to place another pair of condenser plates 19 and 20 adjacent the rudder 28 or steering motor 23, one of the plates being fixed and the other being shown as mounted on a shaft 21 connected by reduction gearing 22 to the steering motor 23. These plates are also placed in a tunable circuit 15' and 48' coupled to a high frequency oscillating circuit, preferably identical with the circuit 10—11—13 above described and comprising the tubes 10', inductance 11' and feed back coil 13', these tubes being preferably placed adjacent to said condenser 19—20. Similarly to the action of tunable circuit 15—48, the high frequency circuit 15'—48' is adapted to be tuned by the condenser 19—20 and is connected to the grid of rectifier tube 14', similar to tube 14. The low frequency output of tube 14' is transmitted through wire 17' beyond the choke 16'.

Thus, in operation, commercial frequency A. C. from supply S passes along one lead through choke coils 64, 64' to plate feed-back coils 13 and 13' and from thence to the plates of vacuum tubes 10 and 10'. Current flows through these tubes to the cathodes thereof and returns to the other sides of the A. C. supply S through self-biasing resistors 60 and 60', this other side of the supply S connected to resistors 60 and 60' being grounded. The grid circuits of tubes 10 and 10' include grid resistors and condensers for automatic biasing, and tuned circuits comprising coils 11, 11' and condensers 12, 12'. These tuned circuits in combination with the feed-back coils 13 and 13', comprise feed-back oscillators, the frequency of oscillation of which is set to the desired frequency by using condensers 12 and 12' of suitable value.

The electromagnetic fields produced by oscillating currents flowing in the coils 13, 13' produce voltages in coupling and repeat back coils 15, 15'. The circuits of these latter coils include the grids of tubes 14 and 14' and self-biasing resistors 60 and 60', such circuits being from one side of coils 15 and 15' through leads 61 and 61' to the grids of the tubes 14 and 14' and from the filaments of the tubes through resistors 60 and 60' to ground back to the other side of coils 15 and 15'. Plate currents of tubes 14 and 14' returning through resistances 60 and 60' cause a voltage drop, the cathode end being positive and the ground end negative. Thus, a negative potential with respect to the cathodes is applied to the grids of tubes 14, 14' by grounding one side of the coupling coils 15 and 15'.

The outputs of both of these systems, i. e., the compass controlled condenser system and the rudder controlled system, are then led into the amplifying device A. U., which may be of any suitable sort familiar to those skilled in the art, the output of which controls the motor 23. Preferably, such a system is of the anti-hunting type and I have illustrated the system shown and described more completely in the copending application of applicant and William T. Cooke, Serial No. 11,424, filed March 16, 1935, for Position control system. According to this system, the phase on the grids of the opposed grid controlled rectifier tubes 24 and 24' is gradually and oppositely shifted to oppositely vary the inductive reactance of the transformers 25 and 25', which act as short circuiting elements across the brushes of the repulsion motor 23, the field 26 of which is excited from the main supply S. The motor is shown as coupled to the tail stock 27 of the rudder 28 through worm gearing 29.

It will readily be apparent that by my system I have secured the advantages of high frequency currents in the condenser control circuits, but have avoided attempting to transmit such currents through the length of the ship, one high frequency circuit being adjacent the compass at the forward end and a similar one adjacent the condenser 19—20 at the rear end. The wires 17, 17' carrying low frequency currents are the only leads of the system running the length of the ship, thereby eliminating the necessity for any special wiring between these points.

A somewhat similar principle is shown as applied to the follow-up control device of Fig. 2. In this figure, three condenser plates are placed at the compass, one plate 50 being shown as on the sensitive or gyroscopic element 30 and the other two plates, 51 and 52, on the follow-up element 31. This element 31 is shown as provided with an azimuth gear 32 driven by a pinion 33 from the follow-up motor 34. Since the condenser plates are adjacent, only one oscillator 10''—11''—13'' need be employed, said oscillator supplying through the coupling coils 53 and 54 both rectifier tubes 55 and 56. The circuit for this form of the invention may be traced from the positive side of the D. C. supply to coil 13'' and thence to the plate of tube 10'' and through this tube to ground, and the negative side of the D. C. supply. The positive side of the supply also feeds the plates of detector tubes 55 and 56 through resistors 57, 58, producing in the latter equal and opposite D. C. voltage drops which are supplied to the grids of tubes 40 and 40' as long as the potentials applied to the grids of tubes 55, 56 are equal. The potentials applied to the grids of tubes 55 and 56 are controlled, however, by coupling coils 53, 54, i. e., by the tuning of these coils toward or away from resonance with the frequency of oscillating circuit 11'', 13'', 10''. This tuning is accomplished by changing the capacity between plates 50, 51 and 50, 52 as the heading of the compass is changed. Hence, a change in the compass bearing causes a change in the voltage applied to the grids of tubes 40, 40' and the plate circuits of these tubes draw opposing but unequal currents through resistors 65, 65' from the A. C. supply transformer 66. The A. C. components and the D. C. surge components of these currents are transmitted through an impedance network consisting essentially of condensers 67, 68 and transformer 69 to the grids of grid controlled rectifier tubes 24 and 24', thereby controlling the magnitude and direction of the current flowing in the armature 34 of the D. C. motor, the field of which is constantly excited from the D. C. line. My copending application Serial No. 38,378, joint with Cooke and Frische, illustrates this type of motor control. As motor 34 is operated, it drives gears 33 and 31 to restore plate 50 to a position of symmetry with respect to plates 51 and 52, thus equalizing the outputs of coils 53, 54, tubes 55, 56, tubes 40, 40' and reducing the signal potentials applied to tubes 24, 24' to zero, thereby effecting the cutting off of the torque of motor 34. Overshooting of the synchronous positions is prevented by the employment of time derivatives of the signal voltage, as explained and claimed in my above mentioned copending applications. As before, the radio frequency portion of the output of the tubes 55 and 56 is filtered out by chokes 16 and 16' and condensers 47 before being led to the slip rings 35, 35' and 35'', which, it will be understood, are placed on the follow-up element so that the operating current may be led into and out of the compass, to and from the supply, and to and from the azimuth motor. As before, a non-hunting amplifying system is interposed between the slip rings and the motor, the same comprising a pair of vacuum tubes 40 and 40', a pair of opposed grid controlled rectifier tubes 24 and 24', and suitable transformers and condensers.

In this form of the invention I have shown an ordinary commutator D. C. motor instead of a repulsion motor, the field 42 being continuously supplied from a D. C. supply D. The current is fed into the armature in opposite directions from the rectified output of the tubes 24, 24', to which alternating current is supplied from opposed secondary windings 44 and 45 of the transformer 46, excited from the A. C. supply S. As before, the output of the grid controlled rectifier tube is controlled by shifting the phases on the grids substantially in accordance with the teachings of my prior joint application above referred to, whereby smooth and non-hunting control is secured. The plate circuits of tubes 10'', 55 and 56 are shown as supplied with D. C.

In operation, when condenser plates 51 and 52 are equally disposed relative to plate 50, the coils 53 and 54 are tuned equally near resonance, and are supplying equal high frequency voltages to the grids of rectifier tubes 55 and 56 which are thus caused to draw equal plate currents through resistors 57 and 58 of the amplifier A'. U'. The drops across resistors 57 and 58 are thus equal and opposite and a balanced condition exists, so that no signal is transferred to the grids of grid controlled rectifier tubes 24 and 24'. When condenser plate 50 moves relative to plates 51 and 52, this balanced condition is disturbed and an A. C. signal is transmitted through the unbalanced plate circuits of tubes 40, 40' to the grids of tubes 24, 24', and motor 34 is driven in a direction to restore alignment of condenser plates 51 and 52 with plate 50, thereby restoring the follow-up element of the compass and driving any desired auxiliary apparatus.

It will be apparent that tubes 10, 10' and 14, 14' of Fig. 1 and tubes 10'' and 55, 56 of Fig. 2 may be replaced, if desired, by multi-element tubes. The functions of tubes 14, 14' and 55, 56 may be satisfactorily performed by diode tubes or by any other suitable forms of rectifiers, such as the dry disc type.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It will be obvious that the system of Fig. 2 may be advantageously applied to liquid compasses for causing the compass bowl to accurately follow movements of the compass card, thereby substantially eliminating error ordinarily due to pivot bearing and liquid friction losses.

Having described my invention, what I claim and desire to secure by Letters Patent is:

1. In a electrical positional control system, a controlling element, a controlled element, a thermionic amplifier for determining the direction of operation of said controlled element, rectifier means, a tunable circuit including a variable condenser operated from said controlling element for supplying high frequency signal potential to said rectifier means, the output of said rectifier means being connected to said thermionic amplifier for controlling the latter, and means responsive to the movement of said controlled element for causing a high frequency potential to be applied to said amplifier for opposing the effect of said signal potential.

2. In an electrical positional control system, a controlling element, a controlled element, a thermionic amplifier for determining the direction of operation of said controlled element, rectifier means, a tunable circuit including a variable condenser operated from said controlling element for supplying high frequency signal potential to said rectifier means, the output of said rectifier means being connected to said thermionic amplifier for controlling the latter, and means controlled by said controlled element for causing a potential to be applied to said amplifier for reducing the effectiveness of said signal potential.

3. In an electrical positional control system, a controlling element, a controlled element, motive means for driving said controlled element in response to movement of said controlling element, a thermionic amplifier for determining the operation of said motive means and hence of said controlled element, push-pull tube means, tunable circuits including variable condensers variable in response to relative movement of said elements for supplying high frequency signal potentials to said tube means, means for by-passing the high frequency currents in the output of said tube means, and means for supplying the unbalanced output of said tube means to said thermionic amplifier for controlling the latter.

4. In an electrical positional control system, a controlling element, a controlled element, a thermionic amplifier for determining the direction of operation of said controlled element, an oscillation generator, rectifier means, and a tunable circuit having variable condenser means therein associated with said controlling element, said tunable circuit being coupled to said oscillation generator and connected for supplying a high frequency signal potential to said rectified means, said rectifier means being connected to said thermionic amplifier for controlling the latter.

5. In an electrical positional control system, a controlling element, a controlled element, a thermionic amplifier for determining the direction of operation of said controlled element, an oscillation generator, rectifier means, a tunable circuit having variable condenser means therein associated with said controlling element, said tunable circuit being coupled to said oscillation generator and connected for supplying a high frequency signal potential to said rectifier means, said rectifier means being connected to said thermionic amplifier for controlling the latter, and means operatively connected to said controlled element for reducing said signal potential as said controlled element moves toward synchronism with said controlling element.

6. In an electrical steering control system, a sensitive controlling element, a controlled steering element, a thermionic amplifier for determining the direction of operation of said controlled steering element, an oscillation generator, a rectifier, a tunable circuit having variable condenser means therein operated from said sensitive controlling element, said tunable circuit being coupled to said oscillation generator and connected for supplying a high frequency signal potential to said rectifier, said rectifier having its output supplied to said thermionic amplifier, and followback means operated from the controlled steering element for causing a potential to be applied to said amplifier to oppose the effect of said signal potential.

7. In an electrical control system, a controlling element, a controlled element, a thermionic amplifier for determining the operation of said controlled element, an oscillation generator, a rectifier, a tunable circuit having variable condenser means therein operated from said controlling element, said tunable circuit being coupled to said oscillation generator and connected for supplying a high frequency signal potential to said rectifier, said rectifier having its output supplied to said thermionic amplifier, an additional oscillation generator, an additional rectifier, and an additional tunable circuit having variable condenser means therein operated from said controlled element, said additional tunable circuit being coupled to said additional oscillation generator and connected for supplying a high frequency potential to said additional rectifier, the latter having its output supplied to said thermionic amplifier in opposition to said signal potential.

8. In a steering control system, movable compass controlling means, a tunable circuit having a variable condenser arranged to be varied by movement of said compass controlling means, means for producing high frequency oscillations in said circuit, a thermionic rectifier having a control element supplied from said circuit, means for by-passing high frequency currents in the output circuit of said rectifier, a thermionic amplifier connected to the output circuit of said rectifier, and a rudder servomotor controlled by said thermionic amplifier.

9. In a control system, movable controlling means, a variable capacitance having a condenser plate movable with said controlling means, a pair of tunable circuits, said capacitance having additional condenser plates connected respectively in said tunable circuits, means for producing high frequency oscillations in said tunable circuits, thermionic rectifiers arranged in opposition and having their control elements respectively supplied from said tuned circuits, means for by-passing high frequency currents in the output circuits of said rectifiers, a thermionic amplifier connected to the output of said rectifiers, a servomotor controlled by said thermionic amplifier, and follow-up mechanism driven by said servomotor for actuating said additional condenser plates.

10. A steering system for dirigible craft having a rudder, comprising rudder actuating means, thermionic valve means for controlling the direction of operation of said rudder actuating means, direction maintaining means, a tunable circuit including a capacity pick-off from said direction maintaining means for supplying a signal potential to said thermionic valve means, and means controlled by said rudder actuating means for causing a potential to be supplied to said thermionic valve means opposing the effect of said signal potential.

11. A steering system for dirigible craft having a rudder, comprising rudder actuating means, thermionic valve means for controlling the direction of operation of said rudder actuating means, direction maintaining means, a source of high frequency oscillations, a circuit coupled to said source of high frequency oscillations and connected to said thermionic valve means for furnishing a signal potential to the latter, a capacity pick-off from said direction maintaining means for varying the tuning of said circuit and hence the magnitude of said signal potential, and means controlled by said rudder actuating means for causing a potential to be supplied to said thermionic valve means opposing the effect of said signal potential.

12. A steering system for dirigible craft having a rudder, comprising rudder actuating means, thermionic valve means for controlling the direction of operation of said rudder actuating means, direction maintaining means, a tunable circuit including a capacity pick-off from said direction maintaining means for supplying a high frequency signal potential to said thermionic valve means, and capacity feed-back means directly operated in response to movements of said rudder for causing a high frequency potential to be supplied to said thermionic valve means opposing the effect of said signal potential.

13. In a steering control system, a controlling element, a controlled element, a thermionic amplifier having means for producing time derivative control potentials connected for determining the direction and rate of operation of said controlled element, an oscillation generator, rectifier means, and a tunable circuit having variable condenser means therein associated with said controlling element, said tunable circuit being coupled to said oscillation generator and connected for supplying a high frequency signal potential to said rectifier means, said rectifier means being connected to said thermionic amplifier for controlling the latter.

14. In a steering control system for craft, movable compass controlling means, an electrical pick-off from said compass means arranged for setting up alternating potentials responsive to the departure of the craft from course, thermionic means for receiving said alternating potentials and for amplifying and rectifying the same, said thermionic means having impedance in its output circuit for producing surge potentials, at least one of which potentials is responsive to a time derivative of the departure of the craft from course, and motive means controlled from said thermionic means and said impedance for causing the craft to return to its course.

15. In a steering control system for craft, a controlling compass means, an electrical pick-off from said compass means arranged for setting up alternating potentials responsive to the departure of the craft from course, thermionic means for receiving said alternating potentials and for amplifying and rectifying the same, said thermionic means having impedance in its output circuit for producing surge potentials, one of which potentials is responsive to a time derivative of the departure of the craft from course, and motive means controlled from said thermionic means and said impedance for turning the rudder in a direction to correct said departure and at a rate proportional to the rate of departure.

16. In a control system, movable controlling and remote controlled means, a pair of spaced tunable circuits each having a separate variable condenser connected to said controlling and controlled means, respectively, so as to be varied thereby, means associated with each of said circuits for producing high frequency oscillations in said circuits, push-pull thermionic tube means having control elements supplied from said circuits, a thermionic amplifier connected to the output circuits of said tube means, and a servo motor controlled by said thermionic amplifier for driving said controlled means and its connected condenser, said last mentioned condenser operating as a feed back means for rebalancing the outputs of said push-pull thermionic tube means.

FRANCIS L. MOSELEY.